United States Patent
Sanders et al.

(10) Patent No.: US 9,961,094 B1
(45) Date of Patent: May 1, 2018

(54) SYMPTOM DETECTION USING BEHAVIOR PROBABILITY DENSITY, NETWORK MONITORING OF MULTIPLE OBSERVATION VALUE TYPES, AND NETWORK MONITORING USING ORTHOGONAL PROFILING DIMENSIONS

(75) Inventors: Derek Sanders, Saratoga, CA (US); Rangaswamy Jagannathan, Sunnyvale, CA (US); Rosanna Lee, Palo Alto, CA (US); Kishor Kakatkar, Kothrud (IN); Xiaohong Pan, Fremont, CA (US)

(73) Assignee: Xangati, Inc, San Jose, CA (US)

( * ) Notice: Subject to any disclaimer, the term of this patent is extended or adjusted under 35 U.S.C. 154(b) by 117 days.

(21) Appl. No.: 12/180,437

(22) Filed: Jul. 25, 2008

Related U.S. Application Data

(60) Provisional application No. 60/963,233, filed on Aug. 3, 2007, provisional application No. 60/963,229, filed
(Continued)

(51) Int. Cl.
*G06F 15/173* (2006.01)
*H04L 29/06* (2006.01)
*H04L 29/08* (2006.01)

(52) U.S. Cl.
CPC ......... *H04L 63/1425* (2013.01); *H04L 67/22* (2013.01); *H04L 63/1408* (2013.01); *H04L 67/306* (2013.01)

(58) Field of Classification Search
CPC ..... G06F 2221/2151; G06F 2221/2137; G06F 1/3209; G06F 19/3418; G06F 21/51;
(Continued)

(56) References Cited

U.S. PATENT DOCUMENTS

| | | |
|---|---|---|
| 5,128,871 A | 7/1992 | Schmitz |
| 5,233,604 A | 8/1993 | Ahmadi et al. |

(Continued)

OTHER PUBLICATIONS

Deering et al. "RFC1883," Internet Protocol Specification, Dec. 1995, pp. 1-27, ver. 6, <http://www.faqs.org/rfcs/rfc1883.html>.
(Continued)

*Primary Examiner* — Mohamed Ibrahim

(57) ABSTRACT

One network monitoring system maintains information regarding historical activity and emergent activity of the network. Comparison of recent with historical activity allows the system to determine whether recent activity is within the realm of normal. The system maintains data structures representing a p.d.f. for observable values of network parameters. Another network monitoring device includes data structures for maintaining information regarding historical and emergent activity of a network. This network monitoring device maintains those data structures including information regarding historical and emergent activity of a network only for those source/destination pairs, and only for those nodes, for which maintaining that information would be substantially meaningful. Yet another network monitoring system includes data structures for maintaining information regarding historical and emergent activity of a network that maintains those data structures only for those combinations of more than one of those multiple profile dimensions for which maintaining that information would be substantially meaningful.

17 Claims, 1 Drawing Sheet

Related U.S. Application Data on Aug. 3, 2007, provisional application No. 60/963,226, filed on Aug. 3, 2007, provisional application No. 60/962,181, filed on Jul. 25, 2007, provisional application No. 60/962,295, filed on Jul. 25, 2007, provisional application No. 60/962,182, filed on Jul. 25, 2007, provisional application No. 60/963,234, filed on Aug. 3, 2007, provisional application No. 60/963,228, filed on Aug. 3, 2007, provisional application No. 60/963,227, filed on Aug. 3, 2007.

(58) Field of Classification Search
CPC .............. G06F 1/3215; H04N 21/6587; H04N 21/44204; H04L 63/10
USPC .................. 709/201, 221, 223, 224, 231
See application file for complete search history.

(56) References Cited

U.S. PATENT DOCUMENTS

| | | | |
|---|---|---|---|
| 5,430,709 A * | 7/1995 | Galloway | ............. 370/241 |
| 5,422,750 A | 8/1995 | Harriman et al. | |
| 5,917,870 A * | 6/1999 | Wolf | ............. 375/356 |
| 5,958,053 A | 9/1999 | Denker | |
| 5,970,064 A | 10/1999 | Clark et al. | |
| 5,991,881 A * | 11/1999 | Conklin et al. | ............. 726/22 |
| 6,046,979 A | 4/2000 | Bauman | |
| 6,076,115 A | 6/2000 | Sambamurthy et al. | |
| 6,115,745 A | 9/2000 | Berstis et al. | |
| 6,167,025 A | 12/2000 | Hsing et al. | |
| 6,189,035 B1 | 2/2001 | Lockhart et al. | |
| 6,202,084 B1 | 3/2001 | Kumar et al. | |
| 6,314,093 B1 | 11/2001 | Mann et al. | |
| 6,314,464 B1 | 11/2001 | Murata et al. | |
| 6,347,339 B1 | 2/2002 | Morris et al. | |
| 6,502,135 B1 | 12/2002 | Minger et al. | |
| 6,725,377 B1 | 4/2004 | Kouznetsov | |
| 6,789,190 B1 | 9/2004 | Cohen | |
| 6,816,910 B1 | 11/2004 | Riciulli | |
| 6,930,978 B2 | 12/2005 | Sharp et al. | |
| 6,973,040 B1 | 12/2005 | Ricciulli | |
| 7,013,482 B1 | 3/2006 | Krumel | |
| 7,051,369 B1 | 5/2006 | Baba | |
| 7,062,782 B1 | 6/2006 | Stone et al. | |
| 7,089,428 B2 | 8/2006 | Farley et al. | |
| 7,260,840 B2 | 8/2007 | Swander et al. | |
| 7,331,060 B1 | 2/2008 | Ricciulli | |
| 7,386,888 B2 | 6/2008 | Liang et al. | |
| 7,461,403 B1 | 12/2008 | Libenzi et al. | |
| 7,702,563 B2 * | 4/2010 | Belson et al. | ............. 705/37 |
| 2004/0054925 A1 | 3/2004 | Etheridge et al. | |
| 2004/0111358 A1* | 6/2004 | Lange et al. | ............. 705/37 |
| 2005/0278779 A1 | 12/2005 | Koppol et al. | |
| 2006/0077905 A1* | 4/2006 | Russell et al. | ............. 370/252 |

OTHER PUBLICATIONS

Steinke. "IP Addresses and Subnet Masks," Network Magazine, Oct. 1995, pp. 1-3, Tables 1 and 3, <http://www.networkmagazine.com/shared/printableArticle.jhtml?articleID=17601068>.

* cited by examiner

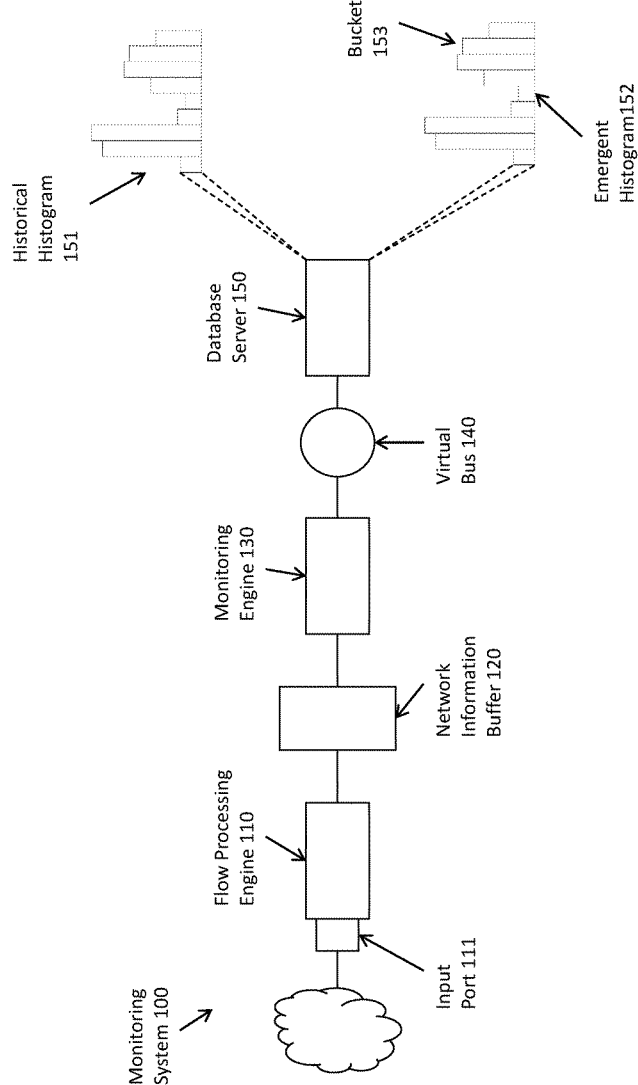

SYMPTOM DETECTION USING BEHAVIOR PROBABILITY DENSITY, NETWORK MONITORING OF MULTIPLE OBSERVATION VALUE TYPES, AND NETWORK MONITORING USING ORTHOGONAL PROFILING DIMENSIONS

CROSS-REFERENCE TO RELATED DOCUMENTS

This application claims priority of, the following related documents:

U.S. Provisional Patent Application 60/962,181, filed Jul. 25, 2007 in the name of the same inventors, titled "Parallel Distributed Network Monitoring", Express Mail mailing number EV 875 991 898 US.

U.S. Provisional Patent Application 60/962,295, filed Jul. 25, 2007 in the name of the same inventors, titled "Network Monitoring Using Virtual Packets", Express Mail mailing number_EV 875 991 884 US.

U.S. Provisional Patent Application 60/962,182, filed Jul. 25, 2007 in the name of the same inventors, titled "Network Monitoring Using Bounded Memory Data Structures", Express Mail mailing number EV 875 991 875 US.

U.S. Provisional Patent Application 60/963,233, filed this same day in the name of the same inventors, titled "Network Monitoring of Behavior Probability Density", Express Mail mailing number EV 875 991 972 US.

U.S. Provisional Patent Application 60/963,234, filed this same day in the name of the same inventors, titled "Symptom Detection Using Behavior Probability Density", Express Mail mailing number EV 875 991 986 US.

U.S. Provisional Patent Application 60/963,229, filed this same day in the name of the same inventors, titled "Continuous Adaptive Monitoring of Network Behavior", Express Mail mailing number EV 875 991 990 US.

U.S. Provisional Patent Application 60/963,226, filed this same day in the name of the same inventors, titled "Spectral Analysis of Periodicity in Network Behavior", Express Mail mailing number EV 875 992 006 US.

U.S. Provisional Patent Application 60/963,228, filed this same day in the name of the same inventors, titled "Network Monitoring of Multiple Observation Value Types", Express Mail mailing number EV 875 992 010 US.

U.S. Provisional Patent Application 60/963,227, filed this same day in the name of the same inventors, titled "Network Monitoring Using Orthogonal Profiling Dimensions", Express Mail mailing number EV 875 992 023 US.

Each of these documents is hereby incorporated by reference as if fully set forth herein. These documents are sometimes referred to herein as the "incorporated disclosures".

BACKGROUND

One known problem when monitoring network activity is that of distinguishing between normal network activity and abnormal network activity. Short-term network activity might represent abnormal activity, might represent a change in normal network activity, or might represent a short-term deviation from normal activity that is itself not problematic. This has the effect that it might become difficult for a network monitoring device to reliably distinguish between those types of network activity that are normal and those types of network activity that are not.

Another known problem is when monitoring network traffic for a relatively large network, the amount of information relating to that network traffic can also be relatively large, with the effect that it might become difficult for a network monitoring device to maintain all of that relatively large amount of information within a reasonable amount of accessible memory.

SUMMARY OF THE DESCRIPTION

In one aspect, a network monitoring system maintains both (1) information regarding historical activity of a network, e.g., in response to a relatively long-term review of network behavior, and (2) information regarding emergent activity of the network, e.g., in response to a relatively short-term review of network behavior. Comparison of recent activity of the network with historical activity of the network allows the network monitoring system to determine whether recent activity of the network is within the realm of normal.

In one embodiment of this aspect, the network monitoring system maintains data structures representing a p.d.f. (probability density function) for observable values of network parameters. Such data structures are maintained both for historical activity of the network and for emergent activity of the network. Recent activity of the network can be compared with the p.d.f. for historical activity to aid in determining whether that recent activity is within the realm of normal. Network activity that is not within the realm of normal can include extreme values of observable network parameters, either too high or too low to be consistent with historical activity of the network, or other values of observable network parameters that are too unlikely to be consistent with historical activity at the network.

In another aspect, a network monitoring device includes data structures for maintaining information regarding historical activity of a network and emergent activity of a network. Those data structures include multiple types of observable values as well as multiple types of combinations of multiple observable values. The network monitoring device maintains those data structures including information regarding historical activity of a network and emergent activity of a network only for those source/destination pairs, and only for those nodes, for which maintaining that information would be substantially meaningful.

In yet another aspect, a network monitoring system includes data structures for maintaining information regarding historical activity of a network and emergent activity of a network. Those data structures include observable values for multiple profile dimensions, including source/destination address, application, location, and time. The data structures also include observable values for combinations of more than one of those multiple profile dimensions, including, e.g., (source address)×(application), and the like.

In one embodiment of this aspect, it is expected that only a relatively sparse set of combinations of more than one of those multiple profile dimensions would have meaningful information associated therewith. The network monitoring system maintains those data structures only for those combinations of more than one of those multiple profile dimensions for which maintaining that information would be substantially meaningful.

DESCRIPTION

Nature of the Description

Read this application in its most general form. This includes, without limitation:
- References to specific structures or techniques include alternative or more general structures or techniques, especially when discussing aspects of the invention, or how the invention might be made or used.
- References to "preferred" structures or techniques generally mean that the inventor contemplates using those structures are techniques, and think they are best for the intended application. This does not exclude other structures or techniques for the invention, and does not mean that the preferred structures or techniques would necessarily be preferred in all circumstances.
- References to first contemplated causes or effects for some implementations do not preclude other causes or effects that might occur in other implementations, even if completely contrary, where circumstances would indicate that the first contemplated causes or effects would not be as determinative of the structures or techniques to be selected for actual use.
- References to first reasons for using particular structures or techniques do not preclude other reasons or other structures or techniques, even if completely contrary, where circumstances would indicate that the first structures or techniques are not as compelling. The invention includes those other reasons or other structures or techniques, especially where circumstances would indicate they would achieve the same effect or purpose as the first reasons, structures, or techniques.

Terms and Phrases

Read this application with the following terms and phrases in their most general form. The general meaning of each of these terms or phrases is illustrative, not in any way limiting.
- The phrase "network monitoring system", and the like, generally refers to any apparatus or method by which information relating to network traffic is identified or reported. The phrase "network monitoring device", and the like, generally refers to any apparatus included in a network monitoring system.
- The phrases "network activity", "network behavior", and the like, generally refer to any information relating to status of a network of processing devices. The phrase "network traffic", and the like, generally refers to any information relating to communication in a network of processing devices.
- The phrase "historical activity", and the like, generally refers to any information responsive to a relatively long-term review of network activity.
- The phrase "emergent activity", and the like, generally refers to any information responsive to a relatively short-term review of network activity.
- The phrase "recent activity", and the like, generally refers to any information responsive to a relatively recent review of network activity.
- The terms "p.d.f." and "probability density function", and the like, generally refer to any information relating to an observed or observable distribution of possible network behavior.

FIGURES AND TEXT

A FIG. 1 shows a block diagram of a system.

FIRST ASPECT

A network monitoring system 100 includes elements as shown in the FIG. 1, including at least: a flow processing engine 110 (coupled to a communication network), a network information buffer 120, a monitoring engine 130, a virtual bus 140, and a database server 150.

The communication network might include any form of communication pathway, such as, a broadcast or narrowcast network, a bus or crossbar switch or other substantially internal communications path in a computing device, a LAN or WAN, a set of external devices disposed for cluster computing or other distributed computing, an enterprise network or internet or intranet, or otherwise.

The flow processing engine 110 includes an input port 111, coupled to the communication network, capable of receiving information from the network regarding communication flows within that network. Such information regarding communication flows might be received from one or more network routers or other traffic reporting devices, as further described in the incorporated disclosures. While this description includes embodiments in which the flow processing engine 110 receives information regarding communication flows, in the context of the invention, there is no particular requirement to so limit the flow processing engine 110 or the invention. For example, the network monitoring system 100 might alternatively operate using information regarding actual network packet traffic, or other information suitable for the operations described herein.

The network information buffer 120 is coupled to an output of the flow processing engine 110, and is capable of receiving network information relating to activity of the communication network. In one embodiment, that network information includes a set of virtual packets, as further described in the incorporated disclosures. While this description includes embodiments in which the network information buffer 120 receives a set of virtual packets, in the context of the invention, there is no particular requirement to so limit the network information buffer 120 or the invention. For example, the network monitoring system 100 might alternatively operate using other information suitable for the operations described herein.

The monitoring engine 130 reads information from the network information buffer 120 and determines substantially instantaneous values for observable values of network parameters.

In one embodiment, these observable values include a bit rate (expressed in bits per second, or an equivalent thereof), a packet rate (expressed in packets per second, or an equivalent thereof), a communication density (expressed as number of concurrent communication partners, or an equivalent thereof), and a communication burstiness (expressed as a change in bit rate, or an equivalent thereof). While this description includes embodiments with regard to these particular observable parameters, in the context of the invention, there is no particular requirement to so limit the monitoring engine 130 or the invention. For example, the network monitoring system 100 might alternatively operate using a first or second derivative of any of these parameters, or other information suitable for the operations described herein.

The virtual bus 140 provides for communication among elements of the network monitoring system 100, such as elements shown in the FIG. 1, including at least: the monitoring engine 130 and the database server 150. Such communication might be conducted using a set of subscription channels, as further described in the incorporated disclosures. While this description includes embodiments in which communication uses subscription channels, in the context of the invention, there is no particular requirement to so limit the virtual bus 140 or the invention. For example, the network monitoring system 100 might alternatively operate using a blackboard communication system, interprocess communication, or other techniques suitable for the operations described herein.

The database server 150 maintains a database of information for use by elements of the network monitoring system 100. The database server 150 includes elements as shown in the FIG. 1, including at least: an historical histogram 151 regarding historical activity of the network, an emergent histogram 152 regarding emergent activity of the network.

The historical histogram 151 and the emergent histogram 152 each include a set of buckets 153, disposed in a sequential order for observable values of a parameter relating to network activity. For example, where that parameter includes a bit rate, the set of buckets 153 might include a $1^{st}$ bucket 153 for less than $10^1$ bits per second,
a $2^{nd}$ bucket 153 for at least $10^1$ bits per second but less than $10^2$ bits per second,
a $3^{rd}$ bucket 153 for at least $10^2$ bits per second but less than $10^3$ bits per second,
a $4^{th}$ bucket 153 for at least $10^3$ bits per second but less than $10^4$ bits per second,
a $5^{th}$ bucket 153 for at least $10^4$ bits per second but less than $10^5$ bits per second,
a $6^{th}$ bucket 153 for at least $10^5$ bits per second but less than $10^6$ bits per second,
a $7^{th}$ bucket 153 for at least $10^6$ bits per second but less than $10^7$ bits per second, and
an $8^{th}$ bucket 153 for at least $10^7$ bits per second.

While this description includes embodiments in which there are this particular number of buckets and in which the buckets are have an exponentially distributed size, in the context of the invention, there is no particular requirement that buckets 153 or the invention should be so limited. For example, the network monitoring system 100 might alternatively operate using a different number of buckets 153, a Gaussian or other distinct distribution of sizes for those buckets 153, a different set of data for those buckets 153, or other information suitable for the operations described herein.

In each bucket 153, the database server 150 maintains a count of an observed set of values as reported by the monitoring engine 130. This has the effect that the historical histogram 151 and the emergent histogram 152 each represent observed activity of the network, with more frequent activity being represented by buckets 153 having a larger count of their respective observed set of values and with less frequent activity being represented by buckets 153 having a smaller count of their respective observed set of values. This has the effect that the historical histogram 151 and the emergent histogram 152 each represent a p.d.f. (probability distribution function) of network activity.

While this description includes embodiments in which the historical histogram 151 and the emergent histogram 152 each represent a p.d.f. (probability distribution function) of network activity, in the context of the invention, there is no particular requirement that the historical histogram 151 and the emergent histogram 152, or the invention, should be so limited. For example, the network monitoring system 100 might alternatively operate using a histogram representing other information, such as for example a cumulative probably distribution function, or other information suitable for the operations described herein.

The historical histogram 151 represents observed historical activity of the network, i.e., information responsive to a relatively long-term review of network activity. The emergent histogram 152 represents observed emergent activity of the network, i.e. information responsive to a relatively short-term review of network activity. This has the effect that recent activity will first be reflected in the emergent histogram 152, and only later be reflected in the historical histogram 151. Accordingly, from time to time, the historical histogram 151 is adjusted to reflect changes in the emergent histogram 152.

This has the effect that, so long as the emergent histogram 152 is consistent with the historical histogram 151, new changes need be made to the historical histogram 151. In contrast, when the emergent histogram 152 becomes inconsistent with the historical histogram 151, those inconsistencies between the emergent histogram 152 and a historical histogram 151 are used to adjust the historical histogram 151 to make the two consistent.

This also has the effect that recent network activity can be compared both with the historical histogram 151 and with the emergent histogram 152. Should recent network activity differ significantly from the historical histogram 151, or from the emergent histogram 152, this might indicate relatively unusual network activity.

Accordingly, the network monitoring device 100 compares recent network activity with the historical histogram 151, and with the emergent histogram 152, to determine whether that recent network activity is relatively unusual.

To make this comparison, the network monitoring device 100 examines recent network activity and determines where in the historical histogram 151 that recent network activity would fall. If the recent network activity falls within the p.d.f. described by the historical histogram 151, the network monitoring device 100 determines that the recent network activity is expected activity, i.e., normal, with respect to the historical histogram 151. If the recent network activity does not fall within the p.d.f. described by the historical histogram 151, network monitoring device 100 determines that the recent network activity is unexpected activity, i.e., not normal, with respect to the historical histogram 151.

For a first example, the historical histogram 151 might indicate that substantially all network activity between a particular source address $S_0$ and a particular destination address $D_1$ falls between $10^3$ bits per second and $10^5$ bits per second, i.e., historical histogram 151 buckets 153 for that source-destination pair are substantially empty outside that range. In such cases, if recent network activity shows an observable value for bits per second larger than the maximum for that range, or smaller than the minimum for that range, the network monitoring device 100 can determine that recent network activity to be not normal. This has the effect that recent network activity can be detected as not normal in either case when that recent network activity is too large or too small to be regarded as normal.

For a second example, the historical histogram 151 might indicate that substantially all network activity between a particular source address $S_0$ and a particular destination address $D_1$ falls within a selected set of buckets 153. One such case might be that historical histogram 151 buckets 153 for that source-destination pair indicate either relatively high-volume traffic (i.e., the historical histogram 151 buckets 153 for, say, more than $10^6$ bits per second show substantial historical network activity) or relatively low-volume traffic (i.e., the historical histogram 151 buckets 153 for, say, less than $10^3$ bits per second show substantial historical network activity), but no substantial network activity in the middle ranges. In such cases, if recent network activity shows an observable value for bits per second other than those ranges shown as likely by the historical histogram 151, the network monitoring device 100 can determine that recent network activity to be not normal. This has the effect that recent network activity can be detected as not normal in either case when that recent network activity is neither too large nor too small to be regarded as normal, but is within a range too unlikely to be regarded as normal.

For a third example, the emergent histogram 152 might differ significantly from the historical histogram 151, e.g., for network activity between a particular source address $S_0$ and a particular destination address $D_1$. In such cases, the network monitoring device 100 can determine that emergent network activity, being more rapidly responsive to recent network activity than historical network activity is responsive to recent network activity, demonstrates that recent network activity is on its way out of the realm determined by the historical histogram 151 to be normal. This has the effect that recent network activity can be detected as not normal even if it is strictly within the realm determined by the historical histogram 151 to be normal, but is trending significantly toward parameters the historical histogram 151 would show to be not normal.

While this description includes embodiments in which the network monitoring system 100 compares recent network activity with the historical histogram 151, in the context of the invention, there is no particular reason that the network monitoring system 100 or the invention should be so limited. For example, the network monitoring system 100 might alternatively operate by comparing recent network activity with the emergent histogram 152, with a combination or conjunction of the historical histogram 151 and the emergent histogram 152, with a separate histogram constructed for the purpose of detecting network activity that is not normal, or using other information suitable for the operations described herein.

SECOND ASPECT

A network monitoring system 100 includes elements as shown in the FIG. 1, including at least: a flow processing engine 110 (coupled to a communication network), a network information buffer 120, a monitoring engine 130, a virtual bus 140, and a database server 150.

The communication network might include any form of communication pathway, such as, a broadcast or narrowcast network, a bus or crossbar switch or other substantially internal communications path in a computing device, a LAN or WAN, a set of external devices disposed for cluster computing or other distributed computing, an enterprise network or internet or intranet, or otherwise.

The flow processing engine 110 includes an input port 111, coupled to the communication network, capable of receiving information from the network regarding communication flows within that network. Such information regarding communication flows might be received from one or more network routers or other traffic reporting devices, as further described in the incorporated disclosures. While this description includes embodiments in which the flow processing engine 110 receives information regarding communication flows, in the context of the invention, there is no particular requirement to so limit the flow processing engine 110 or the invention. For example, the network monitoring system 100 might alternatively operate using information regarding actual network packet traffic, or other information suitable for the operations described herein.

The network information buffer 120 is coupled to an output of the flow processing engine 110, and is capable of receiving network information relating to activity of the communication network. In one embodiment, that network information includes a set of virtual packets, as further described in the incorporated disclosures. While this description includes embodiments in which the network information buffer 120 receives a set of virtual packets, in the context of the invention, there is no particular requirement to so limit the network information buffer 120 or the invention. For example, the network monitoring system 100 might alternatively operate using other information suitable for the operations described herein.

The monitoring engine 130 reads information from the network information buffer 120 and determines substantially instantaneous values for observable values of network parameters.

In one embodiment, these observable values include a bit rate (expressed in bits per second, or an equivalent thereof), a packet rate (expressed in packets per second, or an equivalent thereof), a communication density (expressed as number of concurrent communication partners, or an equivalent thereof), and a communication burstiness (expressed as a change in bit rate, or an equivalent thereof). While this description includes embodiments with regard to these particular observable parameters, in the context of the invention, there is no particular requirement to so limit the monitoring engine 130 or the invention. For example, the network monitoring system 100 might alternatively operate using a first or second derivative of any of these parameters, or other information suitable for the operations described herein.

The virtual bus 140 provides for communication among elements of the network monitoring system 100, such as elements shown in the FIG. 1, including at least: the monitoring engine 130 and the database server 150. Such communication might be conducted using a set of subscription channels, as further described in the incorporated disclosures. While this description includes embodiments in which communication uses subscription channels, in the context of the invention, there is no particular requirement to so limit the virtual bus 140 or the invention. For example, the network monitoring system 100 might alternatively operate using a blackboard communication system, interprocess communication, or other techniques suitable for the operations described herein.

The database server 150 maintains a database of information for use by elements of the network monitoring system 100.

The database server 150 includes elements as shown in the FIG. 1, including at least: a set of substantially instantaneous values for observable values of network parameters. In one embodiment, these observable values include at least:
- a bit rate (measured in bits per second)—indicating a measure of bits sent or received, either between a particular sender $S_0$ and a particular destination $D_0$, or globally by a particular node $N_0$ in the communication network, that node $N_0$ acting either as a sender or a destination for communication;
- a packet rate (measured in packets per second)—indicating a measure of packets sent or received, either between a particular sender $S_0$ and a particular destination $D_0$, or globally by a particular node $N_0$ in the communication network, that node $N_0$ acting either as a sender or a destination for communication;
- a connection density (measured in number of communication partners)—indicating a measure, globally for each particular node $N_0$ in the communication network, of the number of other nodes Ni in the communication network with which that particular node $N_0$ has exchanged information, that node $N_0$ acting either as a sender or a destination for communication;
- a burstiness rate (measured in bits per second per second)—indicating a rate of change in bit rate, either between a particular sender $S_0$ and a particular destination $D_0$, or globally by a particular node $N_0$ in the communication network, that node $N_0$ acting either as a sender or a destination for communication.

In one embodiment, these observable values also include combinations of observable values, e.g., a particular bit rate seen in combination with a particular connection density. As, in one embodiment, there are at least four types of observable values, this has the effect that there are at least six types of combinations of two observable values and at least four types of combinations of three observable values:
- (bit rate)×(packet rate)
- (bit rate)×(connection density)
- (bit rate)×(burstiness rate)
- (packet rate)×(connection density)
- (packet rate)×(burstiness rate)
- (connection density)×(burstiness rate)
- (bit rate)×(packet rate)×(connection density)
- (bit rate)×(packet rate)×(burstiness rate)
- (bit rate)×(connection density)×(burstiness rate)
- (packet rate)×(connection density)×(burstiness rate)
- (bit rate)×(packet rate)×(connection density)×(burstiness rate)

The database server 150 maintains an historical histogram 151, responsive to a long-term view of network activity, and an emergent histogram 152, responsive to a short-term view of network activity. Each of the historical histograms 151 and the emergent histograms 152 include a set of buckets 153, each representing a count of the number of time that observable value has been seen to occur in the course of network activity.

The database server 150 maintains those historical histograms 151 and those emergent histograms 152 only for each observable value for which the network monitoring system 100 determines that there is sufficient information for those historical histograms 151 and emergent histograms 152 to be meaningful. This has the effect that if there is substantially no traffic between a particular sender $S_0$ and a particular destination $D_0$, the network monitoring system 100 would determine that maintaining historical information and emergent information for communication between that particular sender $S_0$ and that particular destination $D_0$ would not have substantial value.

Accordingly, the database server 150 maintains those historical histograms 151 and those emergent histograms 152 for those (sender $S_0$, destination $D_0$) pairs for which there is any substantial bit rate, packet rate, or burstiness value, for those nodes $N_0$ for which there is any substantial global bit rate, global packet rate, or global burstiness value, for those nodes $N_0$ for which there is any substantial global connection density value, and for those (sender $S_0$, destination $D_0$) pairs and for those nodes $N_0$ for which there is any substantial value for any of the combinations of multiple observable values.

The network monitoring system 100, from time to time, determines those observable values and compares them against thresholds (selected for each type of observable value or type of multiple observable values), with the effect of determining if there is any substantial traffic to justify maintaining those historical histograms 151 and emergent histograms 152. It is expected that the number of such (sender $S_0$, destination $D_0$) pairs and the number of such nodes $N_0$ for which maintaining network activity information is justified would be relatively small compared to the number of possible such (sender $S_0$, destination $D_0$) pairs and the number of possible such nodes $N_0$.

THIRD ASPECT

A network monitoring system 100 includes elements as shown in the FIG. 2, including at least: a flow processing engine 110 (coupled to a communication network), a network information buffer 120, a monitoring engine 130, a virtual bus 140, and a database server 150.

The communication network might include any form of communication pathway, such as, a broadcast or narrowcast network, a bus or crossbar switch or other substantially internal communications path in a computing device, a LAN or WAN, a set of external devices disposed for cluster computing or other distributed computing, an enterprise network or internet or intranet, or otherwise.

The flow processing engine 110 includes an input port 111, coupled to the communication network, capable of receiving information from the network regarding communication flows within that network. Such information regarding communication flows might be received from one or more network routers or other traffic reporting devices, as further described in the incorporated disclosures. While this description includes embodiments in which the flow processing engine 110 receives information regarding communication flows, in the context of the invention, there is no particular requirement to so limit the flow processing engine 110 or the invention. For example, the network monitoring system 100 might alternatively operate using information regarding actual network packet traffic, or other information suitable for the operations described herein.

The network information buffer 120 is coupled to an output of the flow processing engine 110, and is capable of receiving network information relating to activity of the communication network. In one embodiment, that network information includes a set of virtual packets, as further described in the incorporated disclosures. While this description includes embodiments in which the network information buffer 120 receives a set of virtual packets, in the context of the invention, there is no particular requirement to so limit the network information buffer 120 or the invention. For example, the network monitoring system 100 might alternatively operate using other information suitable for the operations described herein.

The monitoring engine 130 reads information from the network information buffer 120 and determines substantially instantaneous values for observable values of network parameters.

In one embodiment, these observable values include a bit rate (expressed in bits per second, or an equivalent thereof), a packet rate (expressed in packets per second, or an equivalent thereof), a communication density (expressed as number of concurrent communication partners, or an equivalent thereof), and a communication burstiness (expressed as a change in bit rate, or an equivalent thereof). While this description includes embodiments with regard to these particular observable parameters, in the context of the invention, there is no particular requirement to so limit the monitoring engine 130 or the invention. For example, the network monitoring system 100 might alternatively operate using a first or second derivative of any of these parameters, or other information suitable for the operations described herein.

The virtual bus 140 provides for communication among elements of the network monitoring system 100, such as elements shown in the FIG. 2, including at least: the monitoring engine 130 and the database server 150. Such communication might be conducted using a set of subscription channels, as further described in the incorporated disclosures. While this description includes embodiments in which communication uses subscription channels, in the context of the invention, there is no particular requirement to so limit the virtual bus 140 or the invention. For example, the network monitoring system 100 might alternatively operate using a blackboard communication system, interprocess communication, or other techniques suitable for the operations described herein.

The database server 150 maintains a database of information for use by elements of the network monitoring system 100. That database of information includes data structures for maintaining information regarding historical activity of the communication network and emergent activity of the communication network. Those data structures include observable values for multiple profile dimensions, including at least: source address, destination address, application, location, and time. Those data structures also include observable values for combinations of more than one of those multiple profile dimensions, including, e.g., (source address)×(application), and the like.

In one embodiment, it is expected that only a relatively sparse set of combinations of more than one of those multiple profile dimensions would have meaningful information associated therewith. The network monitoring system 100 maintains those data structures only for those combinations of more than one of those multiple profile dimensions for which maintaining that information would be substantially meaningful, in response to a selected threshold value for network activity in any one of those multiple profile dimensions or any one combination of more than one of those multiple profile dimensions.

Alternative Embodiments

After reading this application, those skilled in the art will recognize that the invention has wide applicability, and is not limited to the embodiments described herein.

TECHNICAL APPENDIX

This application has a technical appendix including the following documents:

Unpublished document titled "Affinity-based Profiling for Symptom Detection", naming contributors Derek SANDERS, Rangaswamy JAGANNATHAN, Rosanna LEE, and Kishor KAKATKAR.

Unpublished document titled "Affinity-based Profiling for Symptom Detection (Revised)", naming contributors Derek SANDERS, Rangaswamy JAGANNATHAN, Rosanna LEE, Kishor KAKATKAR, and Jing LIU.

Unpublished document titled "Determining Periodicity in Crosspoint Behavior Using Spectral Analysis", naming contributors Derek SANDERS, Rangaswamy JAGANNATHAN, Rosanna LEE, Kishor KAKATKAR, and Xiaohong PAN.

Unpublished document titled "Determining Periodicity in Crosspoint Behavior Using Spectral Analysis (Revised)", naming contributors Derek SANDERS, Jing LIU, Rangaswamy JAGANNATHAN, Rosanna LEE, Kishor KAKATKAR, and Xiaohong PAN.

Unpublished document titled "Multidimensional Profiling for Probabilistic Symptom Detection", naming contributors Derek SANDERS, Rangaswamy JAGANNATHAN, Rosanna LEE, Kishor KAKATKAR, and Xiaohong PAN.

Unpublished document titled "Multidimensional Profiling for Probabilistic Symptom Detection (Revised)", naming contributors Derek SANDERS, Rangaswamy JAGANNATHAN, Rosanna LEE, Kishor KAKATKAR, Xiaohong PAN, and Jing LIU.

Unpublished document titled "Scalable Performance Using a Distributed Xangati Solution", naming contributors Rangaswamy JAGANNATHAN, Rosanna K. LEE, Derek SANDERS, Kishor KAKATKAR, and Xiaohong PAN.

Unpublished document titled "Techniques to Improve Performance and Reduce Memory Footprint of a Single-Appliance Xangati Solution", naming contributors Rosanna K. LEE, Xiaohong PAN, Rangaswamy JAGANNATHAN, Derek SANDERS, and Kishor KAKATKAR.

Each of these documents is hereby incorporated by reference as if fully set forth herein.

The invention claimed is:

1. A method for monitoring network activity, including steps of maintaining, by a network monitoring device, a first data structure including information regarding historical activity of message traffic between two or more nodes in a network, wherein said historical activity of represents a behavior of that network over a first time duration having a first starting time and a first ending time, said first data structure including a first histogram of a first set of counts of values of network traffic elements in a first set of mutually exclusive ranges thereof, said first histogram defining a first probability density function of first results of a first crosspoint of mutually exclusive ranges of values, each first result of the first crosspoint including a plurality of observable parameters, said first probability density function being representative of said historical activity for each distinguished value of each of that plurality of observable parameters; maintaining a second data structure including emergent activity of the network, wherein said emergent activity represents a behavior of that network over a second time duration, different from said first time duration, having a second starting time and a second ending time, said second starting time being more recent than said first starting time, said second data structure including a second histogram of a second set of counts of values of network traffic elements in a second set of mutually exclusive ranges thereof, said second histogram defining a second probability density function of second results of a second crosspoint of mutually exclusive ranges of values, each second result of the second crosspoint including said plurality of observable parameters and including counts of values of said observable parameters as in a corresponding said first result of the first crosspoint, said second probability density function being representative of said emergent activity for each distinguished value of each of that plurality of observable parameters; adjusting content of said first data structure in response to the information regarding emergent activity of that network; comparing a set of recent activity of the network, said recent activity of said network being distinguished from said historical activity and from said emergent activity, wherein said recent activity of that network represents a behavior of that network over a third time duration, different from said first time duration and said second time duration, having a third starting time and a third ending time, said third starting time being more recent than said first starting time, with a portion of said first data structure representing a particular one of said first results of the first crosspoint, said particular one of said first results of said first crosspoint being representative of said recent activity; and distinguishing, in response to a result of comparing between whether said recent network activity and at least one of historical network activity or emergent network activity is within the range of approved activity.

2. A method as in claim 1, wherein of adjusting steps include determining whether the information regarding emergent activity of the network is consistent with the information regarding historical activity of that network.

3. A method as in claim 1, wherein determining steps are responsive to whether the recent activity includes observable values higher or lower than a range said first probability density function indicates would be consistent with historical activity of the network.

4. A method as in claim 1, wherein of determining steps are responsive to whether the recent activity includes observable values within a range which said first probability density function indicates would have a probability of consistency with historical activity of the network lower than a selected threshold.

5. A method as in claim 1, wherein the first or the second data structure includes information describing at least one of: a cumulative probability density function, a histogram, or a probability density function.

6. A method as in claim 1, wherein of determining steps are responsive to whether the recent activity includes observable values falling outside a set of ranges for observable values represented in the first or the second data structure.

7. A method as in claim 1, wherein at least one of said first probability density function, said second probability destiny function of said simultaneous combinations of mutually exclusive ranges of values represent a probability of a results of second crosspoint of said observable parameters; said observable parameters being responsive to activity monitored by said network monitoring device.

8. A method as in claim 1, wherein at least one of said first probability density function, said second probability density function of said simultaneous combinations of mutually exclusive ranges of values represent a probability of results of at least one of the first, second crosspoints of said observable parameters; said observable parameters being responsive to activity monitored by said network monitoring device.

9. A method as in claim 1, wherein at least one of said first result of the first crosspoint, second result of the second crosspoint, includes a multivalued result of the first, second observable parameters.

10. A method for monitoring network activity, including steps of maintaining, by a monitoring device, a first data structure including information regarding historical activity of message traffic between two or more nodes in a network, said historical activity of the network represents a behavior of that network over a first time duration having a first starting time and a first ending time, said first data structure including a first histogram of a first set of counts of values of network traffic elements in a first set of mutually exclusive ranges thereof, said first histogram defining a first probability density function of first results of a first crosspoint of mutually exclusive ranges of values of at least a first type of observable value and a second first type of observable value, wherein the information regarding activity of message traffic in a network is maintained only for traffic relating to source and destination pairs in the network, and only for traffic relating to nodes in the network, for which the information regarding activity of message traffic in a network meets or exceeds a selected activity threshold; maintaining a second data structure including emergent activity of the network, wherein said emergent activity represents a behavior of that network over a second time duration, different from said first time duration, having a second starting time and a second ending time, said second starting time being more recent than said first starting time, said second data structure including a second histogram of a second set of counts of values of network traffic elements in a second set of mutually exclusive ranges thereof, said second histogram defining a second probability density function of second results of a second crosspoint of mutually exclusive ranges of values, each second result of the second crosspoint including said plurality of observable parameters and including counts of values of said observable parameters as in a corresponding said first result of the first crosspoint, said second probability density function being representative of said emergent activity for each distinguished value of each of that plurality of observable parameters; adjusting content of said first data structure in response to the information regarding emergent activity of that network; comparing a set of recent activity of the network, said recent activity of said network being distinguished from said historical activity and from said emergent activity, wherein said recent activity of that network represents a behavior of that network over a third time duration, different from said first time duration and said second time duration, having a third starting time and a third ending time, said third starting time being more recent than said first starting time, with a portion of said first data structure representing a particular one of said first results of the first crosspoint, said particular one of said first results of said first crosspoint being representative of said recent activity; and distinguishing, in response to a result of comparing between whether said recent network activity and at least one of historical network activity or emergent network activity is within the range of approved activity.

11. A method as in claim 10, wherein said first data structure represents historical activity of message traffic in that network, and a second data structure represents emergent activity of message traffic in that network; said second data structure including a second histogram of a second set of counts of values of network traffic elements in a second set of mutually exclusive ranges thereof, said second histogram defining a second probability of second results of a second crosspoint of mutually exclusive ranges of values, of a plurality of observable parameters; said method including steps of adjusting content of said first data structure in response to the information regarding emergent activity of message traffic in that network.

12. A method for monitoring network activity, including steps of maintaining, by a monitoring device, a first data structure including information regarding historical activity of message traffic between two or more nodes in a network, wherein said historical activity of that network represents a behavior of the network over a first time duration having a first starting time and a first ending time, a first data structure including a first histogram of a first set of counts of values of network traffic elements in a first set of mutually exclusive ranges thereof, said first histogram defining a first probability density function of first results of a first crosspoint of mutually exclusive ranges of values of observable values for multiple profile dimensions; restricting the information regarding activity of message traffic to only those ones of those first results of the first crosspoint that have sufficient information associated therewith, wherein said sufficient information meets or exceeds a selected activity threshold; maintaining a second data structure including emergent activity of the network, wherein said emergent activity represents a behavior of that network over a second time duration, different from said first time duration, having a second starting time and a second ending time, said second starting time being more recent than said first starting time, said second data structure including a second histogram of a second set of counts of values of network traffic elements in a second set of mutually exclusive ranges thereof, said second histogram defining a second probability density function of second results of a second crosspoint of mutually exclusive ranges of values, each second result of the second crosspoint including said plurality of observable parameters and including counts of values of said observable parameters as in a corresponding said first result of the first crosspoint, said second probability density function being representative of said emergent activity for each distinguished value of each of that plurality of observable parameters; adjusting content of said first data structure in response to the information regarding emergent activity of that network; comparing a set of recent activity of the network, said recent activity of said network being distinguished from said historical activity and from said emergent activity, wherein said recent activity of that network represents a behavior of that network over a third time duration, different from said first time duration and said second time duration, having a third starting time and a third ending time, said third starting time being more recent than said first starting time, with a portion of said first data structure representing a particular one of said first results of the first crosspoint, said particular one of said first results of said first crosspoint being representative of said recent activity; and distinguishing, in response to a result of comparing between whether said recent network activity and at least one of historical network activity or emergent network activity is within the range of approved activity.

13. A method as in claim 12, wherein said first data structure represents network activity information regarding historical activity of that network, and a second data structure represents information regarding emergent activity of that network; said second data structure including a second probability density function of second results of a second crosspoint of mutually exclusive ranges of values of said plurality of observable parameters; said method including steps of adjusting content of said first data structure in response to the information regarding emergent activity of message traffic in that network.

14. A method as in claim 12, wherein those multiple profile dimensions include at least two of: source address, destination address, application, location, or time.

15. A method as in claim 12, wherein the information includes observable values for combinations of more than one of those multiple profile dimensions.

16. A method of operating a network monitoring device, including steps of maintaining, by said network monitoring device, a first data structure defining a first probability density function of historical activity of message traffic between two or more nodes of the network, including a first histogram of first results between a first starting time and a first ending time of a first set of crosspoints of plurality of distinguished values of observable parameters of network traffic elements, the first histogram including a first set of mutually exclusive ranges of those observable parameters; maintaining, by said network monitoring device, a second data structure defining a second probability density function of emergent activity of message traffic between two or more nodes of the network, including a second histogram of second results between a second starting time and a second ending time of a second set of crosspoints of plurality of distinguished values of observable parameters of network traffic elements, the second histogram including a second set of mutually exclusive ranges of those observable parameters; maintaining a second data structure including emergent activity of the network, wherein said emergent activity represents a behavior of that network over a second time duration, different from said first time duration, having a second starting time and a second ending time, said second starting time being more recent than said first starting time, said second data structure including a second histogram of a second set of counts of values of network traffic elements in a second set of mutually exclusive ranges thereof, said second histogram defining a second probability density function of second results of a second crosspoint of mutually exclusive ranges of values, each second result of the second crosspoint including said plurality of observable parameters and including counts of values of said observable parameters as in a corresponding said first result of the first crosspoint, said second probability density function being representative of said emergent activity for each distinguished value of each of that plurality of observable parameters; adjusting content of said first data structure in response to the second data structure; comparing a set of recent network activity having a third starting time and a third ending time, the third starting time being more recent than the first starting time and the second starting time and the third ending time being more recent than the first ending time and the second ending time, with a portion of said first data structure; distinguishing, in response to a result of those steps of comparing, between the recent network activity and at least one of historical network activity or emergent network activity.

17. A method as in claim 16, wherein those mutually exclusive ranges of those counts collectively define a single continuous of those counts.

* * * * *